United States Patent [19]

Chang

[11] Patent Number: 5,824,615
[45] Date of Patent: Oct. 20, 1998

[54] OPTICAL GLASS COMPOSITION FOR PRECISE PRESS MOLDING

[75] Inventor: Myeong Soo Chang, Kyungki-do, Rep. of Korea

[73] Assignee: LG Electronics Inc., Seoul, Rep. of Korea

[21] Appl. No.: 903,039

[22] Filed: Jul. 29, 1997

Related U.S. Application Data

[63] Continuation-in-part of Ser. No. 622,818, Mar. 27, 1996, abandoned.

[30] Foreign Application Priority Data

May 12, 1995 [KR] Rep. of Korea .................. 1995-11780

[51] Int. Cl.⁶ ..................................................... C03C 3/17
[52] U.S. Cl. .................................................................. 501/48
[58] Field of Search ................................................. 501/48

[56] References Cited

U.S. PATENT DOCUMENTS

| | | |
|---|---|---|
| 3,785,835 | 1/1974 | Izumitani et al ......................... 501/48 |
| 4,110,245 | 8/1978 | Yamashita .................................. 501/48 |
| 4,391,915 | 7/1983 | Meden-Peisslinger et al. .......... 501/48 |
| 4,929,387 | 5/1990 | Hayden et al. ............................ 501/48 |
| 5,173,456 | 12/1992 | Hayden et al. ........................... 501/48 |
| 5,526,369 | 6/1996 | Hayden et al. ........................... 501/48 |
| 5,607,886 | 3/1997 | Onozawa .................................. 501/48 |

*Primary Examiner*—Karl Group
*Attorney, Agent, or Firm*—John P. White; Cooper & Dunham LLP

[57] ABSTRACT

The present invention relates to an optical glass material which can be molded by using metal mold having relatively low price by virtue of lowered glass molding temperature, have improved stick resistance between the mold and the glass material, and thus be able to lengthen the lifespan of the mold used.

According to the present invention, is provided an optical glass composition for precise press molding, which comprises 73.9–81.5% of $P_2O_5$, 6.7–8.3% of ZnO, 1.3–7.3% of BaO, 0.9–2.9% of $SrO_2$, 0.8–1.1% of MgO, 4.9–6.1% of $Li_2O$, 1.1–1.4% of $K_2O$, 0.4–1.5% of $Al_2O_3$ and 0.2–0.3% of $Sb_2O_3$, of which the contents are based on oxides calculated from the batch.

1 Claim, No Drawings

OPTICAL GLASS COMPOSITION FOR PRECISE PRESS MOLDING

This application is a continuation-in-part of U.S. Ser. No. 08/622,818, filed Mar. 27, 1996 now abandoned.

FIELD OF THE INVENTION

The present invention relates to an optical glass material for preparing lens, prism or the like. More specifically, the present invention relates to an optical glass material which can be molded by using metal mold having relatively low price, have improved stick resistance between the mold and the glass material, and thus be able to prolong the lifespan of the mold to be used.

BACKGROUND OF THE INVENTION

Up to the present, most of the precise optical elements such as lens, prism, filter or the like have been manufactured by complicated grind-polish processes. However, in case that an optical element for which the processing is very difficult owing to the complicated shape such as non-global surface lens is manufactured by the grind-polish process, the productivity becomes very low as well as the price becomes very high.

Thus, in order to solve these problems, a process for preparing precise optical elements such as lenses by injecting optical glass material into a mold and then subjecting the material to a precise press molding has been recently developed.

Glass has a high molding temperature, being different from plastics having a molding temperature of 100°–200° C. Most of the optical glasses presently used are glass of silicate type, of which the glass transition temperature (Tg) is 435° C. in case of SF11, a glass belonging to a group having lowest Tg, and the practical moding temperature is higher than 500° C.

At the early stage of developing a technique for manufacturing optical elements by press molding, there have been few materials of mold for precise molding of glass because optical glass of silicate type was used, and maximum molding temperature was about 400° C. where a mold made of metal material such as stainless steel could be used. But the mold made of metal material mentioned above was readily deteriorated so that the durability was rapidly lowered because the conventional silicate glass or phosphate glass had a molding temperature of 400° C. or more. To prevent this phenomenon, the only solvation was to use a mold made of WC-Co alloy or ceramic material s of high temperature structure such as $Al_2O_3$ or $Si_3N_4$. However, in case of manufacturing a mold by using mold material such as WC-Co alloy, a cost for manufacturing of the mold becomes several times of the cost for manufacturing a metal mold, and this causes great increase of the cost of a final optical element.

Thus, manufacturers of optical elements and optical instruments made their efforts to develop an optical glass which has low softening point and is moldable at lower temperature.

A method approached to prepare an optical glass having low softening point was to lower the softening point of silicate optical glass which is most generally used. This method was to increase the content of alkali metal oxides ($R_2O$) or alkaline earth metal oxides (RO) while decreasing the content of high melting $SiO_2$ from the conventional silicate optical glass. However, as the melting point of the main component having greatest content in the glass, $SiO_2$, is as high as 1700° C., the softening point of the glass of this type can hardly be lowered to 400° C. or less. In addition, a problem of deterioration of chemical durability occurred if the softening point was excessively lowered.

SUMMARY OF THE INVENTION

The present invention was invented in order to solve the problems of the prior art mentioned above, and the object of the invention is to provide a glass composition which can prevent deterioration of mold used in press molding of an optical element, though a general mold made of metal material, not an expensive mold, is used, by lowering the molding temperature of the glass material to be molded to 400° C. or less.

To achieve the above object, the present invention provides an optical glass composition for precise press molding, which comprises, in weight %, 73.9–81.5% of $P_2O_5$, 6.7–8.3% of ZnO, 1.3–7.3% of BaO, 0.9–2.9% of SrO 0.8–1.1% of MgO, 4.9–6.1% of $Li_2O$, 1.1–1.4% of $K_2O$, 0.4–1.5% of $Al_2O_3$ and 0.2–0.3% of $Sb_2O_3$, of which the contents are based on oxides calculated from the batch.

In the composition mentioned above, $P_2O_5$ is a glass network former as a base material, and other main components are $Li_2O$ and BaO.

DETAILED DESCRIPTION OF THE INVENTION

Here-in-below, the limited ranges, in weight %, of each component are described in detail.

$P_2O_5$, as a glass network former, is an essential component for the construction of glass. Phosphate glass according to the present invention has very high content of $P_2O_5$ as 73% or more. If the content of $P_2O_5$ is higher than 82%, chemical durability should be badly lowered, while it is less than 73%, desired molding temperature could not be obtained because of too high Tg.

$LiO_2$ is added to promote vitrification and to lower the molding temperature. If the content is higher than 7%, chemical resistance should be lowered and tendency to be devitrified should be increased, while it is lower than 4%, the effect cannot be exhibited.

ZnO enhances devitrification resistance and chemical resistance. If the content is higher than 9%, devitrification resistance should be deteriorated and the glass tends to be devitrified (undesirable crystallization), while it is lower than 6%, the effect could not be obtained.

SrO is a component useful for controlling refractive index(nd) and Abbe number(vd). If the content is lower than 0.9%, the effect could not be obtained, while it is higher than 2.9%, Tg should be raised.

MgO and BaO, as alkaline earth metal oxides, are essential components to enhance the stability and chemical resistance of the glass. If the content of MgO is lower than 0.8%, the effect could not be obtained, while it is higher than 1.1%, Tg should be rapidly raised. If the content of BaO is lower than 1.3%, the effect could not be obtained, while it is higher than 7.3%, Tg might be raised. A part of the amount of MgO and BaO can be substituted with CaO and BaO.

Although $Al_2O_3$ is particularly useful for enhancing the stability and chemical resistance of the glass, too much amount added should cause difficulty of glass melting and rapid raise of glass transition temperature (Tg). If the content of $Al_2O_3$ is lower than 0.4%, the effect could not be obtained, while it is higher than 1.5%, Tg should be rapidly raised.

$Sb_2O_3$, as an essential component, lowers the melting temperature of the glass, and inhibits the deposition of platinum colloid. $Sb_2O_3$ is added as a refining agent removing the voids in the glass by generating much bubbles at high temperature where used with KNO2. The amount of only 0.1% can exhibit the effect of refining agent, however, excess amount added lowers chemical resistance of the glass.

$K_2O$ is added in a form of $KNO_3$ to exhibit refining effect, and the amount is about ten folds of $Sb_2O_3$ as a state of $KNO_3$.

DETAILED DESCRIPTION OF TEE PREFERRED EMBODIMENT

Raw materials used for preparation of the glass according to the present invention are ammonium phosphate $(NH_4H_2PO_4)$, lithium phosphate$(Li_3PO_4)$, potassium nitrate $(KNO_3)$, hydrated zinc phosphate$(Zn_3(PO_4)_2 \cdot 4H_2O)$, magnesium phosphate$(Mg_3(PO_4)_2 \cdot 8H_2O)$, barium phosphate $(Ba_3(PO_4)_2)$, strontium oxide (SrO), alumina$(Al_2O_3)$, antimony oxide$(Sb_2O_3)$, and so on.

A predetermined amount of these raw materials corresponding to the composition listed in Table 1 were added in a vessel, and intimately mixed with a stirrer. A predetermined amount of the mixture thus obtained (batch) was introduced in a crucible made of alumina$(Al_2O_3)$, and melted by raising the temperature to about 1000° C., and then poured into a water bath maintained at room temperature to prepare crushed glass. The rapidly cooled glass was broken into small bits to make a remelted batch. The remelted batch was introduced in a platinum crucible, and the temperature was raised to 1000°–1100° C. to melt the glass, and the batch was stirred by a stirrer made of platinum in order to effectively remove bubbles and achieve homogenization. The melted glass was poured in a steel mold or graphite mold of which the temperature have been maintained at a temperature a little higher than glass transition temperature(Tg), and cooled.

According to the process mentioned above, transparent and homogeneous glass was obtained, and the glass transition temperature(Tg), yield point(AT), refractive index(nd) and Abbe number(vd) of each glass was listed at the lower end of Table 1. Tg was 263.1°–336° C., AT was 286°–368° C., and molding temperature was about 350° C. Considering the temperature of press molding in conventional arts being 450° C. or more, the molding temperature was lowered by about 100° C. Refractive index was 1.51853–1.58200, and Abbe number was 65.53–66.63.

The effects by lowering the molding temperature by 100° C. are as follows:

First, as a mold material, metal material can be used instead of WC-Co alloy or ceramic for construction at high temperature, so that the manufacturing of the mold becomes easier, and the cost for manufacturing thereof can be lowered.

Secondly, overall processing time can be reduced by virtue of low molding temperature.

TABLE 1

|  | 1 | 2 | 3 | 4 | 5 |
|---|---|---|---|---|---|
| $P_2O_5$ | 80.99 | 77.28 | 73.90 | 80.68 | 78.39 |
| $Li_2O$ | 6.05 | 5.77 | 5.52 | 5.52 | 5.37 |
| $K_2O$ | 0.25 | 0.24 | 0.23 | 0.23 | 0.22 |
| ZnO | 8.24 | 7.86 | 7.52 | 7.52 | 7.31 |
| MgO | 1.02 | 0.98 | 0.93 | 0.93 | 0.91 |
| BaO | 1.59 | 4.56 | 7.26 | 1.46 | 4.23 |
| SrO | 1.08 | 2.06 | 2.94 | 1.97 | 2.86 |
| $Al_2O_3$ | 0.53 | 1.01 | 1.45 | 1.45 | 0.47 |
| $Sb_2O_3$ | 0.27 | 0.26 | 0.25 | 0.25 | 0.24 |
| Tg(°C.) | 263.1 | 308.1 | 336.0 | 286.0 | 302.5 |
| At(°C.) | 285.9 | 330.1 | 367.9 | 312.4 | 323.9 |
| nd | 1.52188 | 1.52748 | 1.56240 | 1.52087 | 1.52470 |
| vd | 65.95 | 65.73 | 65.53 | 66.46 | 65.90 |

|  | 6 | 7 | 8 | 9 |
|---|---|---|---|---|
| $P_2O_5$ | 77.31 | 81.53 | 80.44 | 78.35 |
| $Li_2O$ | 5.29 | 5.15 | 5.08 | 4.95 |
| $K_2O$ | 0.22 | 0.21 | 0.21 | 0.20 |
| ZnO | 7.21 | 7.02 | 6.92 | 6.75 |
| MgO | 0.90 | 0.87 | 0.86 | 0.34 |
| BaO | 6.96 | 1.36 | 4.01 | 6.51 |
| SrO | 0.94 | 2.74 | 0.91 | 1.76 |
| $Al_2O_3$ | 0.93 | 0.90 | 1.34 | 0.43 |
| $Sb_2O_3$ | 0.24 | 0.23 | 0.23 | 0.22 |
| Tg(°C.) | 313.8 | 302.1 | 322.2 | 306.3 |
| At(°C.) | 347.5 | 340.4 | 347.1 | 341.0 |
| nd | 1.52548 | 1.51853 | 1.51933 | 1.52293 |
| vd | 65.94 | 66.59 | 66.63 | 66.09 |

As described above, the optical glass material of the present invention is advantageous in that general metal material, instead of WC-Co alloy or ceramic material used in press molding, can be used by virtue of lowering the molding temperature so that the cost for mold manufacturing is reduced; that stick resistance between the mold and glass materials is enhanced; and that mold deterioration is reduced so that the lifespan of the mold can be prolonged and overall processing time can be reduced.

What is claimed is:

1. An optical glass composition for precise press molding, consisting essentially of, in weight %, 73.9–81.5% of $P_2O_5$, 6.7–8.3% of ZnO, 1.3–7.3% of BaO, 0.9–2.9% of SrO, 0.8–1.1% of MgO, 4.9–6.1% of $Li_2O$, 1.1–1.4% of $K_2O$, 0.4–1.5% of $Al_2O_3$ and 0.2–0.3% of $Sb_2O_3$, of which the contents are based on oxides calculated from the batch.

* * * * *